United States Patent [19]
Sinha

[11] Patent Number: 5,838,633
[45] Date of Patent: Nov. 17, 1998

[54] METHOD FOR ESTIMATING FORMATION IN-SITU STRESS MAGNITUDES USING A SONIC BOREHOLE TOOL

[75] Inventor: Bikash K. Sinha, West Redding, Conn.

[73] Assignee: Schlumberger Technology Corporation, Ridgefield, Conn.

[21] Appl. No.: 789,441

[22] Filed: Jan. 27, 1997

[51] Int. Cl.$^6$ .................................................... G01V 1/40
[52] U.S. Cl. .............................. 367/31; 367/32; 364/422
[58] Field of Search ................................ 367/25, 31, 32, 367/75; 364/422; 73/152.51, 152.52

[56] References Cited

U.S. PATENT DOCUMENTS

| | | | |
|---|---|---|---|
| 4,794,572 | 12/1988 | Sondergeld et al. | 367/31 |
| 4,850,450 | 7/1989 | Hoyle et al. | 181/102 |
| 4,862,991 | 9/1989 | Hoyle et al. | 181/106 |
| 5,353,637 | 10/1994 | Plumb et al. | 73/152.17 |
| 5,398,215 | 3/1995 | Sinha et al. | 367/31 |
| 5,475,650 | 12/1995 | Sinha et al. | 367/31 |

OTHER PUBLICATIONS

Brugger, K. Thermodynamic Definition of Higher Order Elastic Coefficients, *Physical Review*, vol. 133, No. 6A (Mar. 1964), pp. A1611–1612.

Lang, S. W., et al. Estimating Slowness Dispersion From Arrays of Sonic Logging Waveforms, *Geophysics*, vol. 52, No. 4 (Apr. 1987), pp. 530–544.

Harrison, A. R., et al., Acquisition and Analysis of Sonic Waveforms From a Borehole Monopole and Dipole Source for the Determination of Compressional and Shear Speeds and Their Relation to Rock Mechanical Properties and Surface Seismic Data, *SPE 20557*, (1990), pp. 267–282.

Sinha, Bikash K., Elastic Waves in Crystals Under a Bias, *Ferroelectrics*, 1982 Gordon and Breach, Science Publishers, Inc., vol. 41, pp. 61–73.

Sinha, B. K. and Tiersten, H.F., On the Influence of a Flexural Biasing State on the Velocity of Piezoelectric Surface Waves, *Wave Motion*, North Holland Publishing Co., 1 (1979) pp. 37–51.

Sinha, B. K., et al., Borehole Flexural Modes in Anisotropic Formations, *Geophysics*, vol. 59, No. 7, (Jul. 1994); pp. 1037–1052.

Sinha, B. K., et al., Acoustic Waves in Pressurized Boreholes: A Finite Difference Formulation, *Journal of Geophysical Research*, vol. 101, No. B11 (Nov. 1996), pp. 25, 173–180.

Sinha, B. K., et al., Stoneley and Flexural Modes in Pressurized boreholes, *Journal of Geophysical Research*, vol. 100, No. B11, pp. 22, 375–381.

Sinha, B.K. and Sergio Kostek, Stress–induced Azimuthal Anisotropy in Borehole Flexural Waves, *Geophysics*, vol. 61, No. 6 (Nov.–Dec. 1996), pp. 1899–1907.

*Primary Examiner*—Ian J. Lobo
*Attorney, Agent, or Firm*—David Garrod; Brigitte L. Jeffery

[57] ABSTRACT

A method of estimating formation in-situ stress magnitude and nonlinear constants of an earth formation traversed by a borehole includes analyzing the flexural wave dispersions for dipole sources aligned parallel and perpendicular to the maximum far-field compressive stress direction together with the Stoneley wave dispersion derived from a monopole source. In the presence of formation and borehole stresses above and beyond those in an assumed isotropic reference state, the borehole flexural and Stoneley wave velocity dispersions are also functions of the formation stresses and nonlinear constants. A multi-frequency inversion of the flexural or Stoneley wave velocity dispersions over a selected frequency band is performed to determine the uniaxial stress magnitude S and the quantities $$S\frac{c_{111}}{c_{66}}, S\frac{c_{112}}{c_{66}}, \text{and } S\frac{c_{123}}{c_{66}}$$

where $c_{111}$, $c_{112}$, and $c_{123}$ are the formation non-linear constants.

4 Claims, 5 Drawing Sheets

METHOD FOR ESTIMATING FORMATION IN-SITU STRESS MAGNITUDES USING A SONIC BOREHOLE TOOL

BACKGROUND OF THE INVENTION

The stress state of a formation can be completely characterized by the magnitudes and directions of three principal stresses. Generally, the overburden pressure at a given depth in the formation yields the principal stress in the vertical direction. Consequently, identification of the two principal stresses in the horizontal plane is of practical importance. What has been possible, as suggested by U.S. Pat. No. 4,794,572 to Sondergeld et al., is to use an acoustic borehole tool having a dipole source such as is found in the DSI™ (dipole shear imager) tool of Schlumberger (see U.S. Pat. Nos. 4,862,991 and 4,850,450 to Hoyle et al., and A. R. Harrison et al., SPE 20557, pp. 267–282, 1990) to make measurements of formation anisotropy. According to that invention, the tool is used in its normal relatively low frequency mode (e.g., having a spectrum located somewhere between 1 and 4 kHz) to measure formation anisotropy by measuring velocity of two orthogonal dipole modes. As is accepted in the art, the velocities of the two dipole modes measured by the tool are sensitive to the formation anisotropy (including far-field formation stress), with the fast dipole mode directed along the direction of maximum stress, and the slow dipole mode orthogonal to the fast dipole mode. Even though a measurement of formation anisotropy is suggested by U.S. Pat. No. 4,794,572, that measurement has not been usable to measure formation in-situ stress magnitudes.

A method for obtaining a stress parameter from low frequency flexural wave velocity information is described by U.S. Pat. No. 5,398,215 to Sinha et al. This patent describes a cross-over phenomenon where at low frequencies with uniaxial stress, the radial component parallel to the uniaxial compressive stress direction will show a flexural wave velocity significantly greater than the velocity of the radial component normal to the stress direction. As the frequency increases, the flexural wave dispersion curves for the two cases cross each other, and beyond a certain frequency, the flexural wave velocity corresponding to the radial component normal to the stress direction is predicted to become higher than that for the radial component parallel to the stress direction. If a formation exhibits this cross-over phenomenon, then low frequency information can be used to obtain a value for a formation shear stress parameter defined as $c_{456} 2 T_{23}^{max}/c_{66}$ where $c_{456}$ is a third-order elastic constant of the formation, $T_{23}$ is the maximum shear stress magnitude at forty-five degrees relative to the maximum compressive stress, and $c_{66}$ is a second-order elastic constant of the formation. Without a priori knowledge of both the formation type and nonlinear constants, the shear stress magnitude information is inextricably bound to the stress parameter and the low frequency flexural wave velocity measurement is unusable to determine in-situ stress magnitudes.

The nonlinear parameters of a formation provide an indication of the relative consolidation of the formation which information is useful in the production of hydrocarbons from the formation. With reference to U.S. Pat. No. 5,475,650 to Sinha et al., it is known to use measurements made of the acoustic Stoneley wave and/or flexural wave velocities in a borehole traversing a formation before and after the formation is subjected to biasing stresses in order to determine nonlinear parameters of the formation. Without a priori knowledge of the formation strength, pressurizing the borehole fluid and the surrounding formation may fracture the producing hydrocarbon zone in an uncontrolled manner thereby causing an economic loss due to the production of sand rather than hydrocarbon.

Detailed knowledge of geological formation stresses is desirable in the hydrocarbon production business, as formation stress determination can affect the planning of stimulation treatments for enhanced hydrocarbon recovery, as well as provide predictions of sanding and well-bore stability. As a result, there is a growing demand in the art for in-situ estimations or determinations of formation stresses based on acoustic measurements. In fact, such in-situ determinations can also prove useful with respect to determining the long term stability of the formation and thus the suitability of the formation as a repository for waste disposal.

SUMMARY OF THE INVENTION

The disadvantages of the prior art are overcome by means of the subject invention which comprises a method for estimating formation in-situ stress magnitudes using a sonic borehole tool. The method comprises generating a relatively low frequency signal and a relatively high frequency signal then detecting the slow flexural, fast flexural, and Stoneley wave arrivals for the relatively low frequency signal and the relatively high frequency signal. The flexural and Stoneley wave velocities are determined as a function of frequency. In addition, the flexural wave velocities parallel and perpendicular to the far-field stress direction are determined and associated with stress induced formation anisotropy. The Stoneley and flexural wave velocities are defined for a hydrostatically loaded reference state. A change in the flexural and Stoneley wave velocities due to uniaxial stress is used to determine the stress magnitude and a plurality of nonlinear formation parameters.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENT

Figure 1:
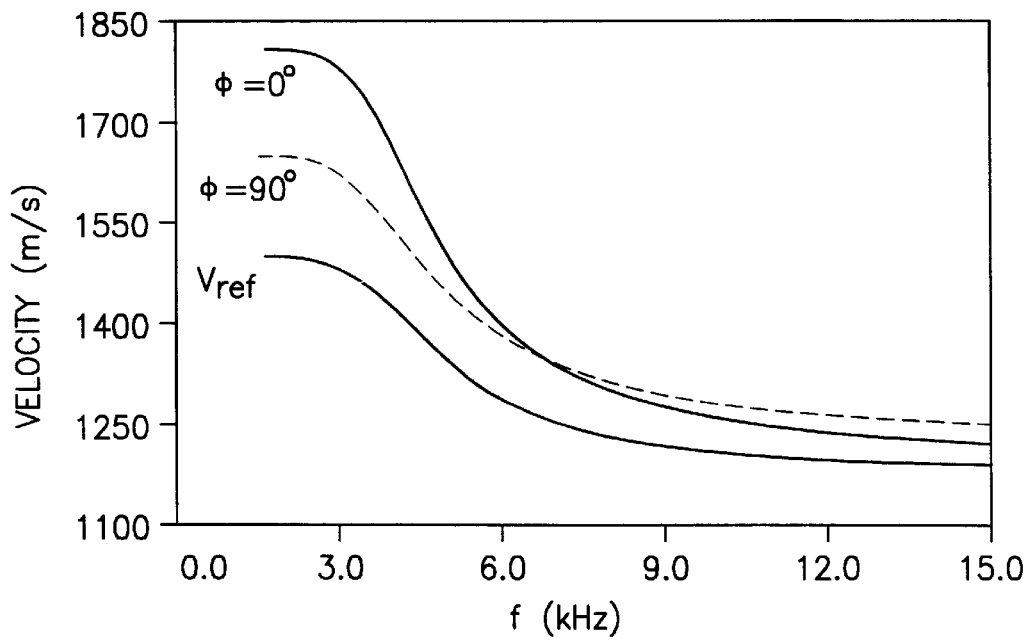
FIG. 1 is a plot of the flexural wave velocities as a function of frequency.

The propagation of small amplitude waves in homogeneous and isotropic solids is governed by the linear equations of motion. However, when the solid is prestressed, the propagation of such waves is properly described by equations of motion for small dynamic fields superposed on a static bias. A static bias represents any statically deformed state of the medium due to an externally applied load or residual stresses. These equations are derived from the rotationally invariant equations of nonlinear elasticity by making a Taylor expansion of the quantities for the dynamic state about their values in the biasing state. See B. K. Sinha and H. F. Tiersten, *On the Influence of a Flexural Biasing State on the Velocity of Piezoelectric Surface Waves*, 1 WAVE MOTION, 37–51 (1979); B. K. Sinha, *Elastic Wave in Crystals Under a Bias*, 41 FERROELECTRICS, 61–73 (1982). These equations for small fields superposed on a large bias properly account for changes in the effective elastic stiffness, mass density and path length between two observation points due to the biasing stresses, and predict the resulting changes in the acoustic wave velocities. The dependence of the acoustic wave velocity on biasing stresses in the propagating medium is referred to as the acoustoelastic phenomenon.

When the biasing stresses in the formation are inhomogeneous, the effective elastic constants as well as the mass density are position dependent. In this situation, a perturbation procedure, such as set forth in B. K. Sinha and H. F. Tiersten, *On the Influence of a Flexural Biasing State on the Velocity of Piezoelectric Surface Waves*, 1 WAVE MOTION, 37–51 (1979), can readily treat spatially varying biasing stresses, such as those due to a nonuniform radial stress distribution away from the borehole, and the corresponding changes in the Stoneley and flexural wave velocities can be calculated as a function of frequency. For a given wave number, the first order perturbation in the eigenfrequency can be given by:

$$\omega'_m = \frac{\int_V K^{NL}_{L\gamma} u^{m*}_{\gamma,L} dV}{2\omega_m \int_V \rho_0 u^m_\gamma u^{m*}_\gamma dV}, \text{ where} \quad (1)$$

$$K_{L\gamma}^{NL} = \hat{c}_{L\gamma M\nu} u_{\nu,M}^m, \quad (2)$$

$$\hat{c}_{L\gamma M\nu} = T_{LM}\delta_{\gamma\nu} + c_{L\gamma M\nu AB}E_{AB} + c_{L\gamma KM}w_{\nu,K} + c_{LKM\nu}w_{\gamma,K}, \quad (3)$$

$$T_{LM}c_{LMRS}w_{R,S}, \quad (4)$$

and $$E_{AB} = \frac{1}{2}(w_{A,B} + w_{B,A}) \quad (5)$$

as described in detail in B. K. Sinha, *Elastic Wave in Crystals Under a Bias*, 41 FERROELECTRICS, 61–73 (1982), where the superscript "NL" denotes a nonlinear Piola-Kirchhoff stress tensor, the quantities $\hat{c}_{L\gamma M\nu}$ and $c_{L\gamma M\nu AB}$ are second-order and third-order elastic constants, $T_{LM}$, $E_{AB}$, and $w_{\gamma,K}$ denote biasing stresses, strains, and static displacement gradients respectively, $K_{L\gamma}^{NL}$ are the perturbations in the Piola-Kirchhoff tensor elements from the linear portion, $K_{L\gamma}^{L}$, for the reference isotropic medium before the application of any biasing stresses, $\rho_0$ is the mass density of the propagating medium, $u_\gamma^m$ represents the eigen-solution for the reference isotropic medium for a selected propagating mode in the assumed reference state, the index m refers to a family of normal modes for a borehole in an isotropic medium, and $\omega'_m$ are the frequency perturbations of the eigenfrequency $\omega_m$. The procedure for obtaining the Stoneley (m=0) and flexural (m=1) wave solutions in the reference state is described in B. K. Sinha, A. N. Norris, S. K. Chang, *Borehole Flexural Modes in Anisotropic Formations*, 59 GEOPHYSICS, 1037–1052 (1994).

The borehole flexural and Stoneley wave velocity dispersions are functions of several borehole fluid and linear formation parameters in the assumed isotropic reference state. Those linear parameters are $V_P$, $V_S$, $V_f$, a, and $\rho s/\rho f$, where $V_P$ and $V_S$ are the formation compressional and shear wave speeds in the reference state, respectively; $V_f$ is the formation borehole fluid compressional wave speed; a is the borehole radius; and $\rho s/\rho f$ is the ratio of the formation and fluid mass densities. In the presence of formation and borehole stresses above and beyond those in the reference state, the borehole flexural and Stoneley wave velocity dispersions are also functions of the formation stresses and nonlinear constants. In the art, there are several different notations for the linear (second-order elastic) and nonlinear (third-order elastic) constants of a medium. See K. Brugger, *Thermodynamic Definitions of Higher-Order Elastic Coefficients*, 133 PHYSICAL REVIEW, A1611–A1612 (1964).

Figure 2:
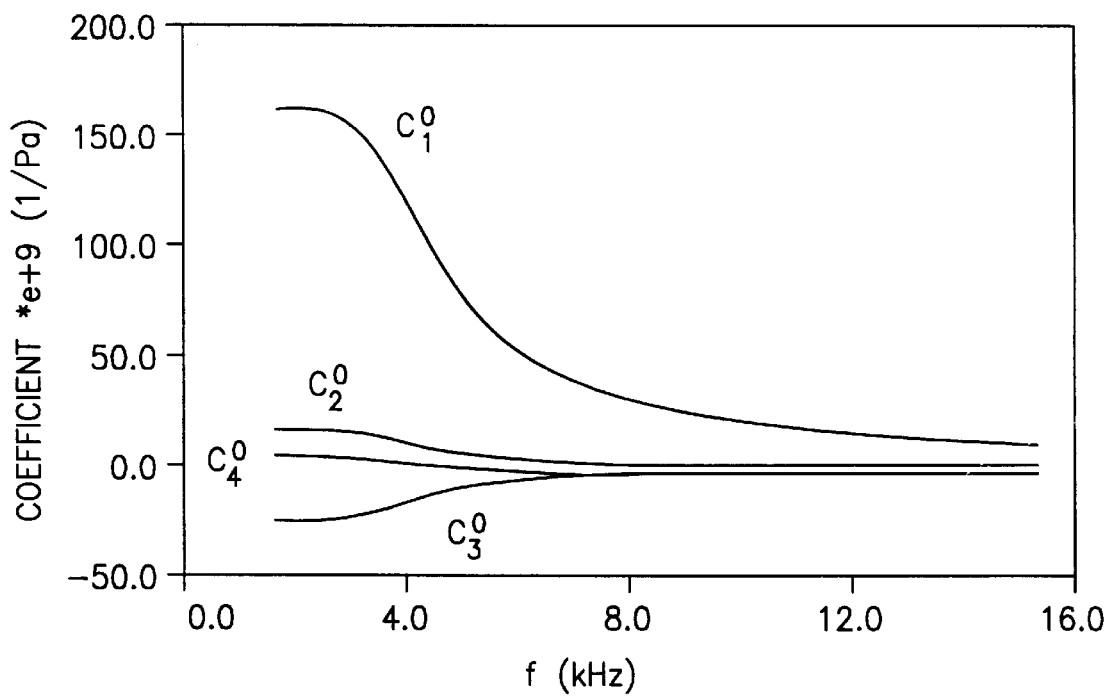
FIG. 2 is a plot of the sensitivity to flexural dispersion of the formation stress and nonlinear constants for the flexural wave parallel to the far-field stress.

Turning to FIG. 1 and substituting into equation (1) the linear as well as nonlinear elastic constants for an isotropic medium subject to a uniaxial stress together with the flexural wave solution in the reference state, the change in the flexural wave phase velocity at a given frequency is given by:

$$\frac{v_0 - v_{ref}}{v_{ref}} = C_1^0 S + C_2^0 S \frac{c_{111}}{c_{66}} + C_3^0 S \frac{c_{112}}{c_{66}} + C_4^0 S \frac{c_{123}}{c_{66}}, \quad (6)$$

where $v_0$ denotes the flexural wave velocity parallel to the far-field stress direction and $v_{ref}$ is the flexural velocity in the reference state. FIG. 2 illustrates the frequency sensitivity of coefficients $C_1^0$, $C_2^0$, $C_3^0$, and $C_4^0$ to the flexural velocity due to a uniaxial stress of unit magnitude. The coefficients are defined in the Appendix.

Figure 3:
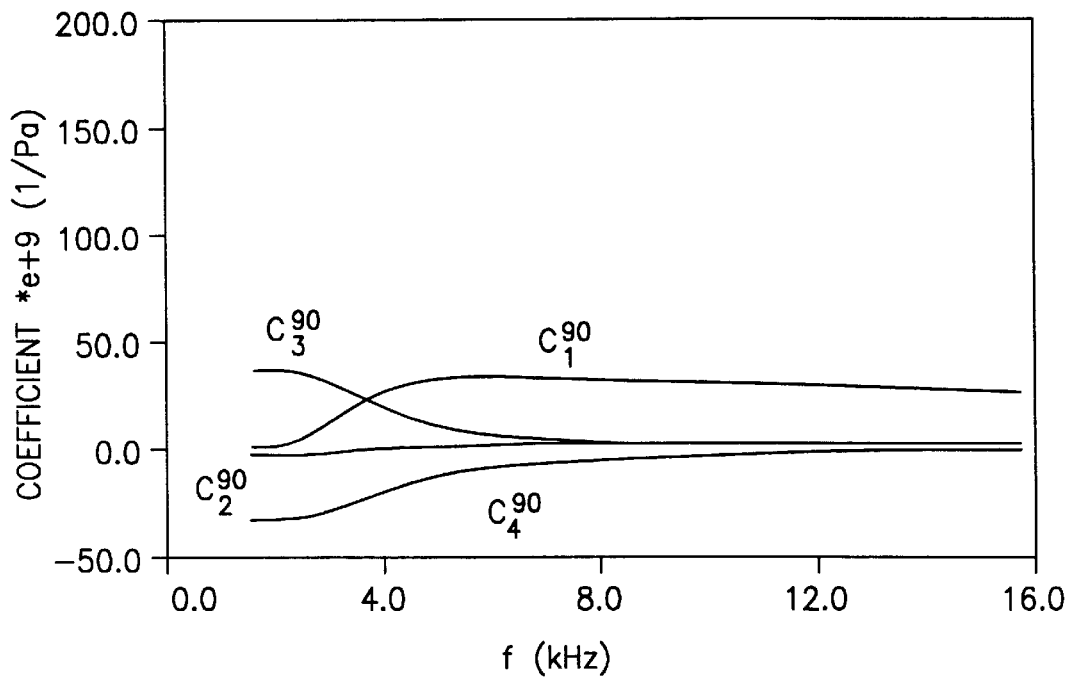
FIG. 3 is a plot of the sensitivity to flexural dispersion of the formation stress and nonlinear constants for the flexural wave perpendicular to the far-field stress.

Still referring to FIG. 1, the change in the phase velocity for flexural waves perpendicular to the far-field stress direction is given by:

$$\frac{v_{90} - v_{ref}}{v_{ref}} = C_1^{90} S + C_2^{90} S \frac{c_{111}}{c_{66}} + C_3^{90} S \frac{c_{112}}{c_{66}} + C_4^{90} S \frac{c_{123}}{c_{66}}, \quad (7)$$

where $v_{90}$ denotes the flexural wave velocity perpendicular to the far-field stress direction, $v_{ref}$ is the flexural velocity in the reference state, and coefficients $C_1^{90}$, $C_2^{90}$, $C_3^{90}$, and $C_4^{90}$ are given by the same expressions as for $C_1^0$, $C_2^0$, $C_3^0$, and $C_4^0$ except that the biasing stresses and strains are rotated by 90°. FIG. 3 illustrates the frequency sensitivity of coefficients $C_1^{90}$, $C_2^{90}$, $C_3^{90}$, and $C_4^{90}$ to the flexural velocity due to a uniaxial stress of unit magnitude. The coefficients are defined in the Appendix.

Subtracting equation (7) from equation (6) yields $$(C_1^0 - C_1^{90})S + (C_2^0 - C_2^{90})S\frac{c_{111}}{c_{66}} + (C_3^0 - C_3^{90})S\frac{c_{112}}{c_{66}} + \quad (8)$$

$$(C_4^0 - C_4^{90})S\frac{c_{123}}{c_{66}} = \frac{v_0 - v_{90}}{v_{ref}},$$

which, after multiplying both sides of equation (8) by $v_{ref}$, can be re-written as $$A_1 S + A_2 S \frac{c_{111}}{c_{66}} + A_3 S \frac{c_{112}}{c_{66}} + A_4 S \frac{c_{123}}{c_{66}} = B = v_0 - v_{90}, \quad (9)$$

where $A_1$, $A_2$, $A_3$, $A_4$, and B are functions of frequency. Equation 9, evaluated at a minimum of four different discreet frequencies in the range of 2 kHz to 10 kHz, forms the basis of multi-frequency inversion for the stress magnitude and nonlinear constants from the flexural wave velocity differences for radial polarization parallel and perpendicular to the far-field stress direction. Preferably, the discrete frequencies are separated by at least 500 Hz.

Figure 4:
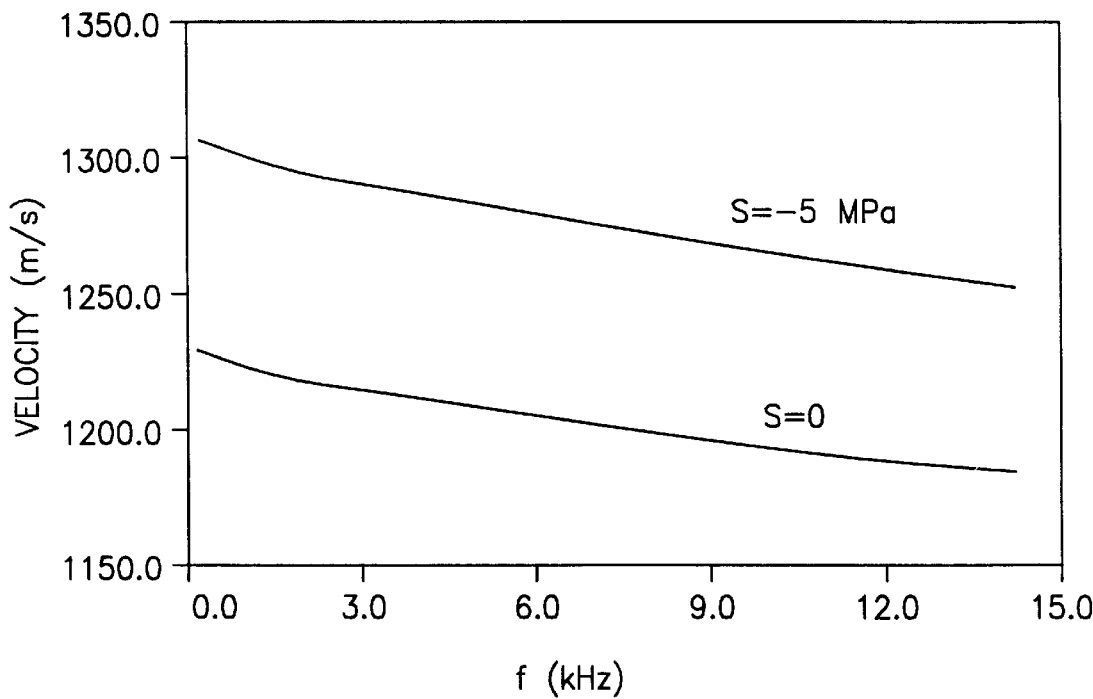
FIG. 4 is a plot of the Stoneley wave dispersions as a function of frequency.

In addition, stress induced fractional changes in the Stoneley dispersion can also be employed as a basis for the inversion process to determine the stress magnitude and nonlinear constants defined about the reference state. Turning to FIG. 4 and substituting into equation (1) the linear as well as nonlinear elastic constants for an isotropic medium subject to a uniaxial stress together with the Stoneley wave solution in the reference state, the change in the phase velocity at a given frequency is given by:

$$\frac{v^{Stoneley} - v_{ref}^{Stoneley}}{v_{ref}^{Stoneley}} = C_1 S + C_2 S \frac{c_{11}}{c_{66}} + C_3 S \frac{c_{112}}{c_{66}} + C_4 S \frac{c_{123}}{c_{66}}, \quad (10)$$

Figure 5:
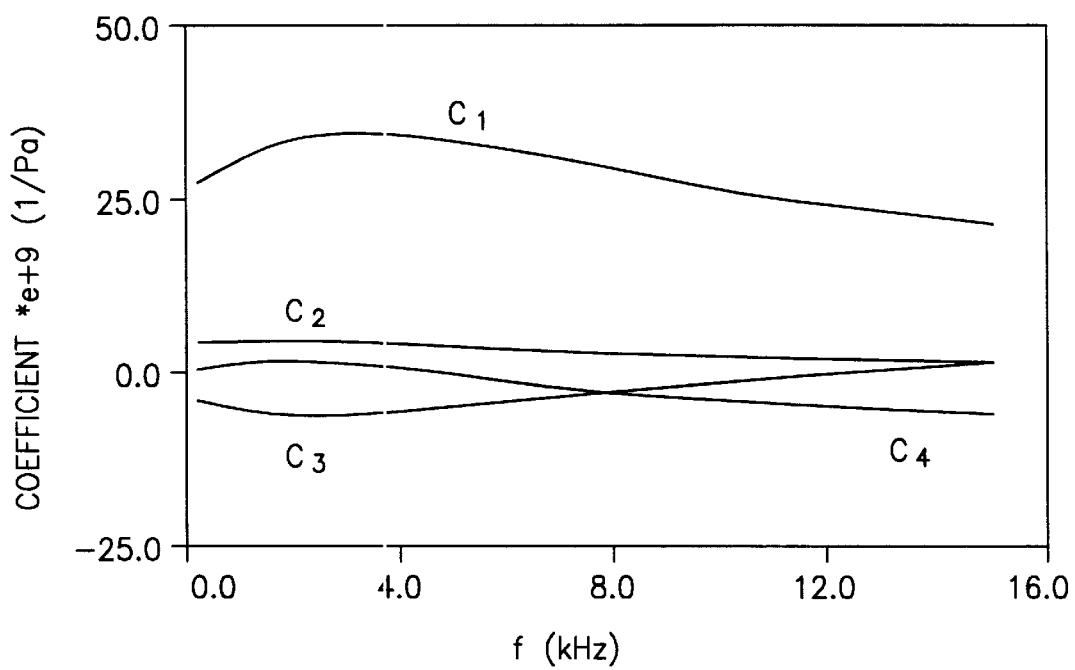
FIG. 5 is a plot of the sensitivity to the Stoneley dispersion of the formation stress and nonlinear constants.

FIG. 5 illustrates the frequency sensitivity of coefficients $C_1$, $C_2$, $C_3$, and $C_4$ to the change in the Stoneley wave velocity due to a uniaxial stress of unit magnitude. The coefficients are defined in the Appendix.

In an alternative embodiment of the subject invention, for frequencies less than about 3 kHz, the tube wave velocity together with the two shear wave velocities corresponding to the shear polarization parallel and perpendicular to the far-field stress direction form the basis of low frequency inversion for the stress magnitude and the nonlinear constants. The two shear wave velocities are the low-frequency asymptotes of the flexural wave velocity dispersions for the flexural waves aligned parallel and perpendicular to the stress direction. The inversion process is formulated as AX=B according to the equations set forth below:

$$A = \begin{bmatrix} 1 & 1-v & -v \\ 1-v & \frac{1-v}{2} & -\frac{v}{2} \\ -v & -\frac{v}{2} & \frac{1-v}{2} \end{bmatrix}, \quad (11)$$

$$X = \begin{bmatrix} S \\ \frac{c_{155} S}{c_{66}} \\ \frac{c_{144} S}{c_{66}} \end{bmatrix}, \quad (12)$$

$$B = \begin{bmatrix} \frac{4c_{66}^2 (1+v)}{\rho_f V_T^3} (V_{TS} - V_T) \\ \rho_s (V_{12}^2 - V_S^2) \\ \rho_s (V_{13}^2 - V_S^2) \end{bmatrix}. \quad (13)$$

The input to the low-frequency inversion model are the following parameters at the assumed reference state of the formation: the borehole fluid density $\rho_f$, formation mass density $\rho_s$, fluid compressional speed $V_f$, formation compressional $V_P$ and shear $V_S$ speeds, and the tube wave speed $V_T$—all at the assumed reference state of the formation. The constant $v$ refers to the formation Poisson's ratio. $V_{12}$ and $V_{13}$ refer to the shear wave velocities with polarization parallel and perpendicular to the far-field stress direction.

The two shear wave speeds $V_{12}$ and $V_{13}$ together with the tube wave speed $V_{TS}$ measured in the presence of the uniaxial stress are required to estimate the stress magnitude S and two of the three formation nonlinear constants $c_{155}$ and $c_{144}$. As shown by K. Brugger, *Thermodynamic Definitions of Higher-Order Elastic Coefficients*, 133 PHYSICAL REVIEW, A1611–A1612 (1964), these nonlinear constants are known to have the following relationship:

$$c_{155} = \frac{1}{4} (c_{111} - c_{112}), \quad (14)$$

and $$c_{144} = \frac{1}{2} (c_{112} - c_{123}). \quad (15)$$

Figure 6:
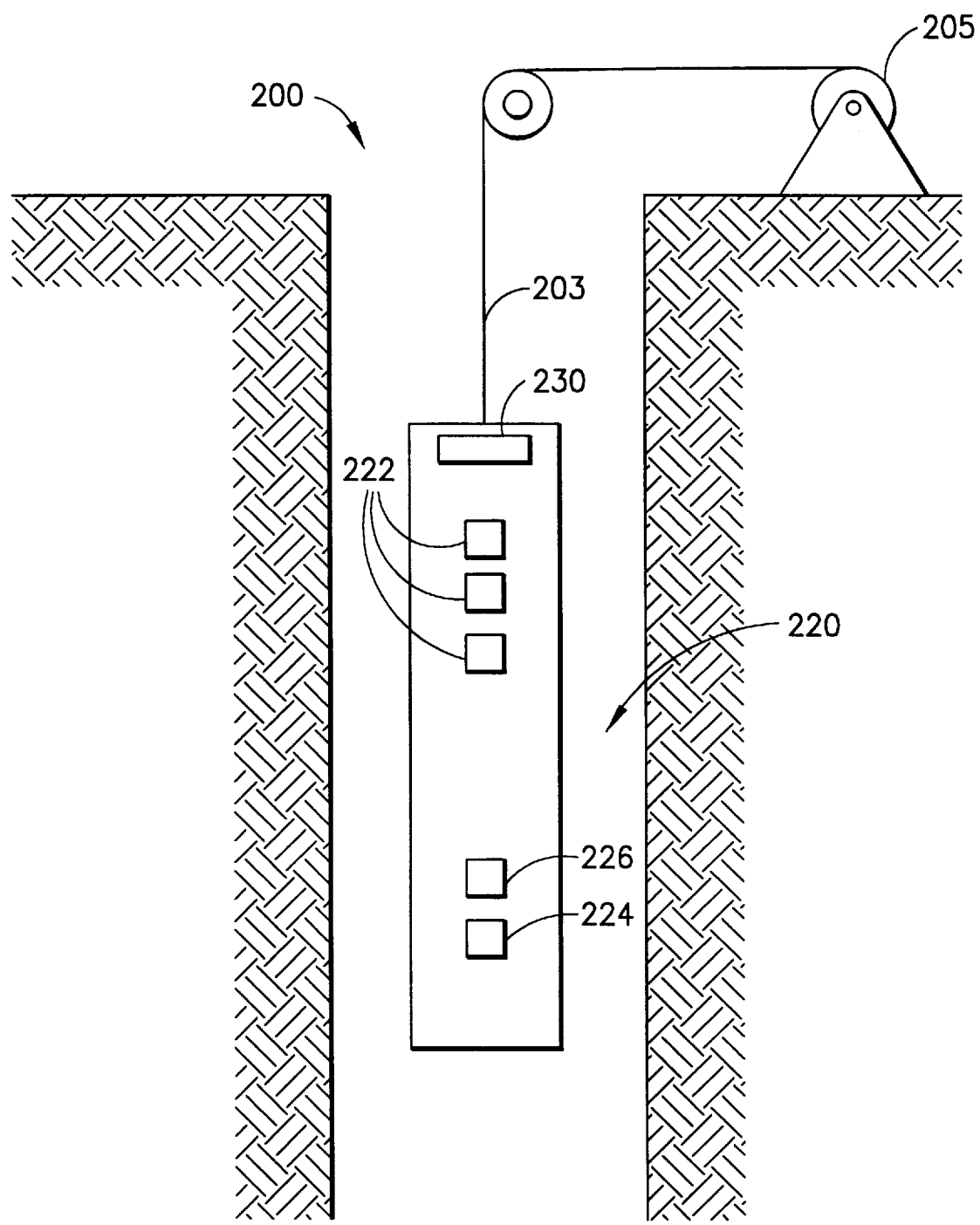
FIG. 6 is a schematic diagram of a borehole tool for carrying out the invention; and, FIG. 7 is a flow chart of the preferred method of the invention for estimating formation in-situ stress magnitude and nonlinear formation constants.

The borehole tool 220 for carrying out the method of the invention is seen in FIG. 6. The tool is suspended in a borehole 200 by means of a wireline 203 and a winch 205, as is well known in the art. The preferred borehole tool is the DSI™ tool of Schlumberger which includes a plurality of acoustic detectors 222 and one or both of a monopole source 224 and a dipole source 226. The monopole source 224 provides a Stoneley wave as well as a compressional headwave in all formations, and also provides a shear headwave in fast formations. The dipole source 226, on the other hand, provides a flexural wave and the shear wave arrival time can be found as the low frequency limit of the flexural wave dispersion arrivals. The acoustic detectors 222 should include both monopole and dipole detectors. The borehole tool 220 further includes a downhole processing means 230, which typically comprises a microprocessor and associated circuitry, coupled to the detectors. The downhole processing means can determine the shear and compressional wave velocities as well as processing the flexural or Stoneley wave information using Prony's method. A detailed description of Prony's method is set forth in S. W. Lang et al., *Estimating Slowness Dispersion from Arrays of Sonic Waveforms*, 52 GEOPHYSICS, 530–544 (1989).

Figure 7:
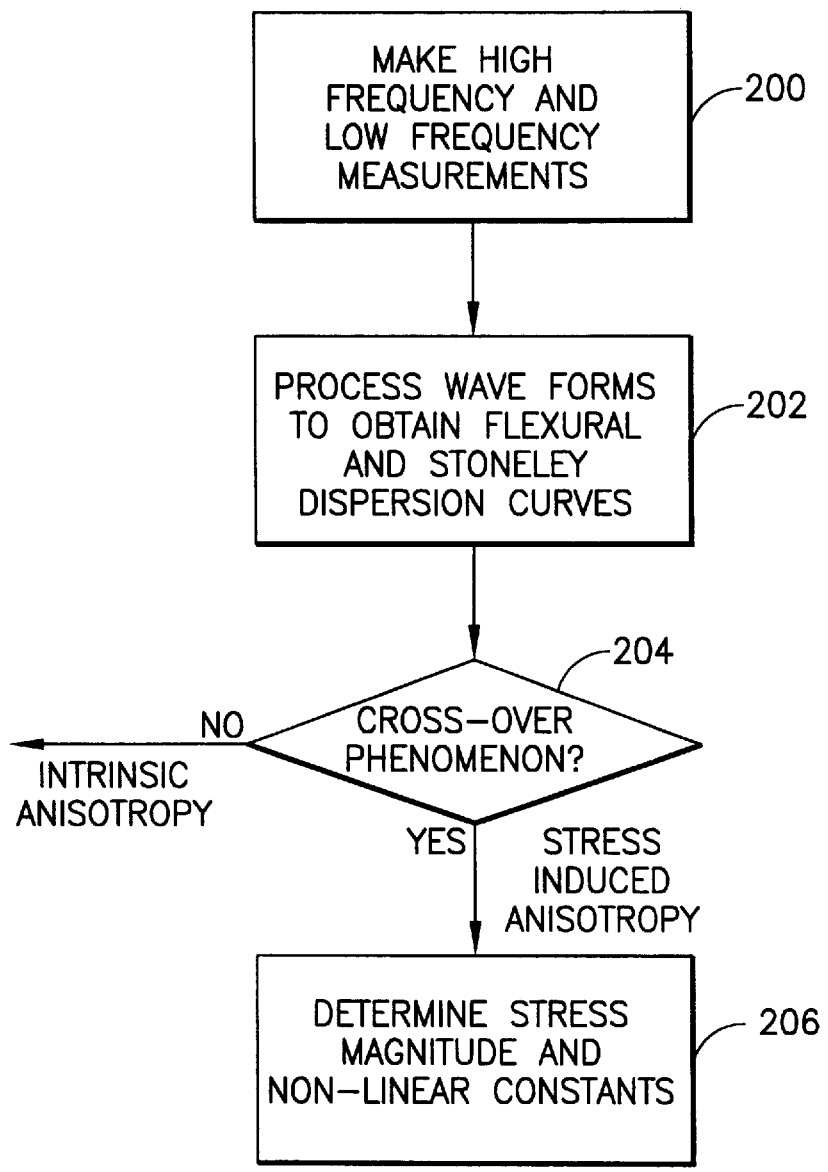

With the theory as set forth above, the preferred method of the invention for estimating formation in-situ stress magnitudes using a sonic borehole tool is shown by the flow chart in FIG. 7. After acquiring the high and low frequency velocity measurements that result from firing one or both of a monopole source and a dipole source at step 200, the data is processed using Prony's technique to obtain the flexural and Stoneley dispersion curves at step 202. If the flexural wave dispersion curves exhibit the cross-over phenomenon indicating stress induced anisotropy, at step 204, the stress magnitude and non-linear constants are derived from either the low frequency or the multi-frequency inversion technique at step 206.

As indicated above, the low-frequency technique requires the following parameters defined by the reference state of the formation: the borehole fluid density $\rho_f$, formation mass density $\rho_s$, fluid compressional speed $V_f$, formation compressional $V_P$ and shear $V_S$ speeds, and the tube wave speed $V_T$. A priori knowledge of the formation type and nonlinear constants is not required in order to select the aforementioned parameters. The low-frequency technique further requires the slow shear or flexural velocity $V_{12}$ and the fast shear or flexural velocity $V_{13}$ together with the tube wave speed $V_{TS}$ measured in the presence of the uniaxial stress. The velocity equations (11), (12), and (13) are then inverted and solved for the stress magnitude S and the formation nonlinear constants $c_{155}$ and $c_{144}$.

When the low-frequency values of the tube wave speed and the two shear wave speeds in the presence of uniaxial stresses are unavailable, the multi-frequency technique is an alternate method for determining the in-situ formation stress magnitude and formation nonlinear constants. Stress induced fractional changes in the flexural dispersion given by equation (8) is inverted and solved for the stress magnitude S and the quantities $$S\frac{c_{111}}{c_{66}}, S\frac{c_{112}}{c_{66}}, \text{ and } S\frac{c_{123}}{c_{66}}.$$

Equation (6) or (7) may also be inverted and solved for the stress magnitude S and the quantities $$S\frac{c_{111}}{c_{66}}, S\frac{c_{112}}{c_{66}}, \text{ and } S\frac{c_{123}}{c_{66}}.$$

Further, stress induced fractional changes in the Stoneley dispersion given by equation (10) may be inverted and solved for the stress magnitude S and the quantities $$S\frac{c_{111}}{c_{66}}, S\frac{c_{112}}{c_{66}}, \text{ and } S\frac{c_{123}}{c_{66}}.$$

Table I below contains the input data of flexural differences at four different frequencies, and the four inverted parameters of the stress magnitude S and the quantities $$S\frac{c_{111}}{c_{66}}, S\frac{c_{112}}{c_{66}}, \text{ and } S\frac{c_{123}}{c_{66}}.$$

The assumed linear parameters in the reference state are as follows: the formation compressional velocity, $V_P$=2320 m/s; the shear wave velocity, $V_S$=1500 m/s; the borehole radius, a=10.16 cm; the formation density, $\rho_s$=2062 kg/m³; and the borehole fluid mass density, $\rho_f$=1000 kg/m³. The flexural velocity dispersion in the reference state, $v_{ref}$, is shown in FIG. 1.

TABLE I

| f kHz | $V_0-V_{90}$ m/s | S MPa | $Sc_{111}/c_{66}$ MPa | $Sc_{112}/c_{66}$ MPa | $Sc_{123}/c_{66}$ MPa |
|---|---|---|---|---|---|
| 2.5 | 154.9 | −5.024 | 22.86 | 3.278 | −2.547 |
| 3.0 | 146.1 | (−5.0) | (22.87) | (3.281) | (−2.544) |
| 3.5 | 127.7 | | | | |
| 4.0 | 99.7 | | | | |

It is seen that the values of the stress magnitude S and the quantities $$S\frac{c_{111}}{c_{66}}, S\frac{c_{112}}{c_{66}}, \text{ and } S\frac{c_{123}}{c_{66}}$$

agree closely with the actual values shown in the parentheses.

The foregoing description of the preferred and alternate embodiments of the present invention have been presented for purposes of illustration and description. It is not intended to be exhaustive or limit the invention to the precise form disclosed. Obviously, many modifications and variations will be apparent to those skilled in the art. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

APPENDIX

Sensitivity Coefficients for Flexural Dispersions to the Formation Stress and Nonlinear Constants The sensitivity coefficients $C_1^0$, $C_2^0$, $C_3^0$, and $C_4^0$, are given by the following integrals $$C_1^0 = \frac{I_1}{2\omega_m^2 I_N}, \tag{1}$$

$$C_2^0 = \frac{c_{66} I_2}{2\omega_m^2 I_N}, \tag{2}$$

$$C_3^0 = \frac{c_{66} I_3}{2\omega_m^2 I_N}, \tag{3}$$

$$C_4^0 = \frac{c_{66} I_4}{2\omega_m^2 I_N}. \tag{4}$$

Since the integral $I_1$ consists of several lengthy expressions, we express this integral as a sum of 9 terms as shown below:

$$I_1 = \sum_{Q=1}^{9} I_{1Q}, \tag{5}$$

where $$I_{11} = \tag{6}$$

$$\int_a^\infty r\,dr \int_0^{2\pi} d\phi \left[ T_{ZZ} u_{z,z} + c_{12} \left[ E_{RR} u_{r,r} + E_{\phi\phi} \left( \frac{u_{\phi,\phi}}{r} + \frac{u_r}{r} \right) \right] + c_{12} E_{R\phi} \left( \frac{u_{r,\phi}}{r} - \frac{u_\phi}{r} + u_{\phi,r} \right) \right] u_{z,z}^*,$$

$$I_{12} = \int_a^\infty r\,dr \int_0^{2\pi} d\phi \left[ c_{12} E_{RR} u_{z,z} + 2c_{11} E_{RR} u_{r,r} + T_{RR} u_{r,r} + c_{12}(E_{RR} + E_{\phi\phi}) \left( \frac{u_{\phi,\phi}}{r} + \frac{u_r}{r} \right) + c_{66} E_{RZ} \left( \frac{u_{r,\phi}}{r} - \frac{u_\phi}{r} + u_{\phi,r} \right) + (T_{R\phi} + c_{12} E_{R\phi}) u_{r,\phi} + c_{11} E_{R\phi} u_{\phi,r} \right] u_{r,r}^*, \tag{7}$$

$$I_{13} = \int_a^\infty r\,dr \int_0^{2\pi} d\phi \left[ c_{12} E_{\phi\phi} u_{z,z} + c_{12}(E_{RR} + E_{\phi\phi}) u_{r,r} + (2c_{11} E_{\phi\phi} + T_{\phi\phi}) \left( \frac{u_{\phi,\phi}}{r} + \frac{u_r}{r} \right) + c_{66} E_{R\phi} \left( \frac{u_{r,\phi}}{r} - \frac{u_\phi}{r} + u_{\phi,r} \right) + (T_{R\phi} + c_{12} E_{R\phi}) u_{\phi,r} + c_{11} E_{R\phi} \left( \frac{u_{r,\phi}}{r} - \frac{u_\phi}{r} \right) \right] \left( \frac{u_{\phi,\phi}^*}{r} + \frac{u_r^*}{r} \right), \tag{8}$$

$$I_{14} = \int_a^\infty r\,dr \int_0^{2\pi} d\phi \left[ T_{RR} u_{z,r} + T_{R\phi} \frac{u_{z,\phi}}{r} + c_{66}(E_{RR} u_{r,z} + E_{R\phi} U_{\phi,z}) \right] u_{z,r}^*, \tag{9}$$

$$I_{15} = \int_a^\infty r\,dr \int_0^{2\pi} d\phi \left[ c_{66} E_{RR}(u_{z,r} + u_{r,z}) + c_{66} E_{R\phi} \left( \frac{u_{z,\phi}}{r} + u_{\phi,z} \right) + (T_{ZZ} + c_{66} E_{RR}) u_{r,z} + c_{66} E_{R\phi} u_{\phi,z} \right] u_{r,z}^*, \tag{10}$$

$$I_{16} = \int_a^\infty r\,dr \int_0^{2\pi} d\phi \left[ T_{ZZ} u_{\phi,z} + c_{66}(E_{R\phi} u_{r,z} + E_{\phi\phi} u_{\phi,z}) + \tag{11}$$

-continued $$c_{66}E_{R\phi}(u_{z,r}+u_{r,z})+c_{66}E_{\phi\phi}\left(\frac{u_{z,\phi}}{r}+u_{\phi,z}\right)\right]u_{\phi,z}^*,$$

$$I_{17}=\int_a^\infty rdr\int_0^{2\pi}d\phi\left[T_{R\phi}u_{z,r}+T_{\phi\phi}\frac{u_{z,\phi}}{r}+\right.\tag{12}$$

$$\left.c_{66}(E_{R\phi}u_{r,z}+E_{\phi\phi}u_{\phi,z})\right]\frac{u_{z,\phi}^*}{r},$$

$$I_{18}=\int_a^\infty rdr\int_0^{2\pi}d\phi\left[c_{12}E_{R\phi}u_{z,z}+(c_{11}+c_{66})E_{R\phi}u_{r,r}+\right.\tag{13}$$

$$c_{66}E_{RR}\left(\frac{u_{r,\phi}}{r}-\frac{u_\phi}{r}\right)+(T_{R\phi}+(c_{66}+c_{12})E_{R\phi})\left(\frac{u_{\phi,\phi}}{r}+\frac{u_r}{r}\right)+$$

$$\left.(T_{RR}+c_{66}E_{\phi\phi})u_{\phi,r}+c_{66}E_{\phi\phi}\left(\frac{u_{r,\phi}}{r}-\frac{u_\phi}{r}+u_{\phi,r}\right)\right]u_{\phi,r}^*,$$

$$I_{19}=\int_a^\infty rdr\int_0^{2\pi}d\phi\left[c_{12}E_{R\phi}u_{z,z}+\right.\tag{14}$$

$$(c_{11}+c_{66})E_{R\phi}\left(\frac{u_{\phi,\phi}}{r}+\frac{u_r}{r}\right)+c_{66}E_{\phi\phi}u_{\phi,r}+$$

$$(T_{R\phi}+(c_{66}+c_{12})E_{R\phi})u_{r,r}+(T_{\phi\phi}+c_{66}E_{RR})\left(\frac{u_{r,\phi}}{r}-\frac{u_\phi}{r}\right)+$$

$$\left.c_{66}E_{RR}\left(\frac{u_{r,\phi}}{r}-\frac{u_\phi}{r}+u_{\phi,r}\right)\right]\left(\frac{u_{r,\phi}^*}{r}-\frac{u_\phi^*}{r}\right).$$

The remaining integrals $I_2$, $I_3$, $I_4$, and $I_N$ take the following forms $$I_2=\int_a^\infty rdr\int_0^{2\pi}d\phi\left[\left[E_{RR}u_{r,r}+\right.\right.\tag{15}$$

$$\frac{1}{2}E_{R\phi}\left(\frac{u_{r,\phi}}{r}-\frac{u_\phi}{r}+u_{\phi,r}\right)\right]u_{r,r}^*+E_{\phi\phi}u_{\phi,\phi}+$$

$$\frac{1}{2}E_{R\phi}\left(\frac{u_{r,\phi}}{r}-\frac{u_\phi}{r}+u_{\phi,r}\right)\right]\left(\frac{u_{\phi,\phi}^*}{r}+\frac{u_r^*}{r}\right)+$$

$$\frac{1}{4}\left[E_{RR}(u_{r,z}+u_{z,r})+E_{R\phi}\left(\frac{u_{z,\phi}}{r}+u_{\phi,z}\right)\right](u_{z,r}^*+u_{r,z}^*)+$$

$$\frac{1}{4}\left[E_{R\phi}(u_{r,z}+u_{z,r})+E_{\phi\phi}\left(\frac{u_{z,\phi}}{r}+u_{\phi,z}\right)\right]\left(u_{\phi,z}^*+\frac{u_{z,\phi}^*}{r}\right)+$$

$$\frac{1}{4}\left[(E_{RR}+E_{\phi\phi})\left(\frac{u_{r,\phi}}{r}-\frac{u_\phi}{r}+u_{\phi,r}\right)+\right.$$

$$\left.\left.2E_{R\phi}\left(u_{r,r}+\frac{u_{\phi,\phi}}{r}+\frac{u_r}{r}\right)\right](u_{\phi,r}^*+u_{r,\phi}^*)\right],$$

$$I_3=\int_a^\infty rdr\int_0^{2\pi}d\phi\left[\left[(E_{RR}+E_{\phi\phi})u_{z,z}+E_{RR}u_{r,r}+\right.\right.\tag{16}$$

$$E_{\phi\phi}\left(\frac{u_{\phi,\phi}}{r}+\frac{u_r}{r}\right)+E_{R\phi}\left(\frac{u_{r,\phi}}{r}-\frac{u_\phi}{r}+u_{\phi,r}\right)\right]u_{z,z}^*+$$

$$\left[E_{RR}u_{z,r}+E_{\phi\phi}u_{r,r}+(E_{RR}+E_{\phi\phi})\left(\frac{u_{\phi,\phi}}{r}+\frac{u_r}{r}\right)-\right.$$

$$\frac{1}{2}E_{R\phi}\left(\frac{u_{r,\phi}}{r}-\frac{u_\phi}{r}+u_{\phi,r}\right)\right]u_{r,r}^*+$$

$$\left[E_{\phi\phi}u_{z,z}+(E_{RR}+E_{\phi\phi})u_{r,r}+E_{RR}\left(\frac{u_{\phi,\phi}}{r}+\frac{u_r}{r}\right)-\right.$$

$$\frac{1}{2}E_{R\phi}\left(\frac{u_{r,\phi}}{r}-\frac{u_\phi}{r}+u_{\phi,r}\right)\right]\left(\frac{u_{\phi,\phi}^*}{r}+\frac{u_r^*}{r}\right)+$$

$$\frac{1}{4}\left[(2E_{\phi\phi}-E_{RR})(u_{r,z}+u_{z,r})-3E_{R\phi}\left(\frac{u_{z,\phi}}{r}+u_{\phi,z}\right)\right](u_{z,r}^*+u_{r,z}^*)+$$

$$\frac{1}{4}\left[(2E_{RR}-E_{\phi\phi})\left(\frac{u_{z,\phi}}{r}+u_{\phi,z}\right)-3E_{R\phi}(u_{z,r}+u_{r,z})\right](u_{\phi,z}^*+u_{z,\phi}^*)+$$

$$\frac{1}{2}(2E_{R\phi}u_{z,z}-E_{R\phi})\left(u_{r,r}+\frac{u_{\phi,\phi}}{r}+\frac{u_r}{r}\right)(u_{\phi,r}^*+u_{r,\phi}^*)-$$

$$\frac{1}{2}(E_{RR}+E_{\phi\phi})\left(\frac{u_{r,\phi}}{r}-\frac{u_\phi}{r}+u_{\phi,r}\right)(u_{\phi,r}^*+u_{r,\phi}^*)\right],$$

$$I_4=\int_a^\infty rdr\int_0^{2\pi}d\phi\left[\left[E_{\phi\phi}u_{r,r}+E_{RR}\left(\frac{u_{\phi,\phi}}{r}+\frac{u_r}{r}\right)-\right.\right.\tag{17}$$

$$E_{R\phi}\left(\frac{u_{r,\phi}}{r}-\frac{u_\phi}{r}+u_{\phi,r}\right)\right]u_{z,z}^*+E_{\phi\phi}u_{z,z}u_{r,r}^*+$$

$$E_{RR}u_{z,z}\left(\frac{u_{\phi,\phi}^*}{r}+\frac{u_r^*}{r}\right)+\frac{1}{2}\left[E_{R\phi}\left(\frac{u_{z,\phi}}{r}+u_{\phi,z}\right)-\right.$$

$$\left.E_{\phi\phi}(u_{z,r}+u_{r,z})\right](u_{z,r}^*+u_{r,z}^*)+\frac{1}{2}\left[E_{R\phi}(u_{r,z}+u_{z,r})-\right.$$

$$\left.E_{RR}\left(\frac{u_{z,\phi}}{r}+u_{\phi,z}\right)\right](u_{\phi,z}^*+u_{z,\phi}^*)-$$

$$\left.E_{R\phi}u_{z,z}\left(u_{\phi,r}^*+\frac{u_{r,\phi}^*}{r}-\frac{u_\phi^*}{r}\right)\right],$$

$$I_N=\int_0^a rdr\int_0^{2\pi}d\phi\rho_f[u_r^f u_r^*+u_\phi^f u_\phi^*+u_z^f u_z^*]+\tag{18}$$

$$\int_a^\infty rdr\int_0^{2\pi}d\phi\rho_s[u_r u_r^*+u_\phi u_\phi^*+u_z u_z^*],$$

where $T_{ZZ}$ is the axial stress in the formation; $E_{RR}$, $E_{\phi\phi}$, and $E_{R\phi}$ are the static strains in the formation written in the cylindrical-polar coordinates; $c_{11}$, $c_{12}$, and $c_{66}$ are the linear elastic constants of the formation in the reference state; $u_{z,r}^f$, $u_{100}^f$, and $u_z^f$ denote the flexural wave solution in the fluid; a * superscript denotes complex conjugate; and, $u_r$, $u_{100}$, and $u_z$ are the flexural wave solution in the formation with radial polarization parallel to the far-field stress direction.

The sensitivity coefficients $C_1^{90}$, $C_2^{90}$, $C_3^{90}$, and $C_4^{90}$, are given by the same expressions as for $C_1^0$, $C_2^0$, $C_3^0$, and $C_4^0$, except for the important difference that all of the biasing stresses and strains are rotated by 90° from before so that the far-field stress direction is now perpendicular to the flexural wave radial polarization direction.

Sensitivity Coefficients for the Stoneley Dispersion to the Formation Stress and Nonlinear Constants The sensitivity coefficients $C_1$, $C_2$, $C_3$, and $C_4$, are given by the following integrals $$\frac{V^{Stoneley} - V_{ref}^{Stoneley}}{V_{ref}^{Stoneley}} = C_1 S + C_2 S \frac{c_{111}}{c_{66}} + C_3 S \frac{c_{112}}{c_{66}} + C_4 S \frac{c_{123}}{c_{66}}, \quad (19)$$

where $$C_1 = \frac{J_1}{2\omega_m^2 J_N}, \quad (20)$$

$$C_2 = \frac{c_{66} J_2}{2\omega_m^2 J_N}, \quad (21)$$

$$C_3 = \frac{c_{66} J_3}{2\omega_m^2 J_N}, \quad (22)$$

$$C_4 = \frac{c_{66} J_4}{2\omega_m^2 J_N}. \quad (23)$$

where $J_1$, $J_2$, $J_3$, and $J_4$ are expressed in terms of surface integrals as shown below:

$$J_1 = \int_a^\infty r\, dr \int_0^{2\pi} d\phi \left\{ \left[ T_{ZZ} u_{z,z} + c_{12} \left( E_{RR} u_{r,r} + E_{\phi\phi} \frac{u_r}{r} \right) \right] u_{z,z}^* + \right. \quad (24)$$

$$\left[ c_{12} E_{RR} u_{z,z} + (T_{RR} + 2c_{11} E_{RR}) u_{r,r} + c_{12}(E_{RR} + E_{\phi\phi}) \frac{u_r}{r} \right] u_{r,r}^* +$$

$$\left[ c_{12} E_{\phi\phi} u_{z,z} + (T_{\phi\phi} + 2c_{11} E_{\phi\phi}) \frac{u_r}{r} + c_{12} (E_{RR} + E_{\phi\phi}) u_{r,r} \right] \frac{u_r^*}{r} +$$

$$[T_{RR} u_{z,r} + c_{66} E_{RR} u_{r,z}] u_{z,r}^* + [c_{66} E_{RR} (u_{z,r} + u_{r,z}) +$$

$$\left. (T_{ZZ} + c_{66} E_{RR}) u_{r,z}] u_{r,z}^* \right\},$$

$$J_2 = \int_a^\infty r\, dr \int_0^{2\pi} d\phi \left\{ [E_{RR} u_{r,r}] u_{r,r}^* + \left[ E_{\phi\phi} \frac{u_r}{r} \right] \frac{u_r^*}{r} + \right. \quad (25)$$

$$\left. \frac{1}{4} [E_{RR}(u_{z,r} + u_{r,z})](u_{z,r}^* + u_{r,z}^*) \right\},$$

$$J_3 = \int_a^\infty r\, dr \int_0^{2\pi} d\phi \left\{ \left[ (E_{RR} + E_{\phi\phi}) u_{z,z} + \right. \right. \quad (26)$$

$$E_{\phi\phi} \frac{u_r}{r} + E_{RR} u_{r,r} \right] u_{z,z}^* + \left[ E_{RR} u_{z,z} + E_{\phi\phi}) u_{r,r} + (E_{RR} + E_{\phi\phi}) \frac{u_r}{r} \right] u_{r,r}^* +$$

$$\left[ E_{\phi\phi} u_{z,z} + E_{RR} \frac{u_r}{r} + (E_{RR} + E_{\phi\phi}) u_{r,r} \right] \frac{u_r^*}{r} +$$

$$\left. \frac{1}{4} [(2E_{\phi\phi} - E_{RR})(u_{z,r} + u_{r,z})](u_{z,r}^* + u_{r,z}^*) \right\},$$

$$J_4 = \int_a^\infty r\, dr \int_0^{2\pi} d\phi \left\{ \left[ E_{\phi\phi} u_{r,r} + E_{RR} \frac{u_r}{r} \right] u_{z,z}^* + [E_{\phi\phi} u_{z,z}] u_{r,r}^* + \right. \quad (27)$$

$$\left. [E_{RR} u_{z,z}] \frac{u_r^*}{r} - \frac{1}{2} [E_{\phi\phi}(u_{z,r} + u_{r,z})](u_{z,r}^* + u_{r,z}) \right\},$$

$$J_N = \int_0^a r\, dr \int_0^{2\pi} d\phi [\rho_f(u_r^f u_r^{f*} + u_z^f u_z^{f*})] + \quad (28)$$

$$\int_a^\infty r\, dr \int_0^{2\pi} d\phi [\rho_s(u_r u_r^* + u_z u_z^*)],$$

where $u_r^f$ and $u_z^f$ denote the Stoneley wave solution in the borehole fluid; and, $u_r$ and $u_z$ are the corresponding solution in the formation.

What I claim is:

1. A method of estimating in-situ stress magnitude of an earth formation traversed by a borehole containing borehole fluid by utilizing a sonic logging tool having a monopole source, a plurality of dipole sources, and a plurality of sonic detectors, said method comprising:

a) generating a relatively low frequency signal and a relatively high frequency signal with at least one source;

b) detecting the slow flexural, fast flexural, and Stoneley wave arrivals at the detectors for the relatively low frequency signal and the relatively high frequency signal;

c) determining the Stoneley wave velocity as a function of frequency;

d) determining the azimuthal orientation of the maximum velocity of at least one of the slow and fast flexural wave arrivals for at least one of the relatively low frequency signal and the relatively high frequency signal;

e) determining the velocities of the slow and fast flexural waves, as a function of frequency, for the relatively low frequency signal and for the relatively high frequency signal at the determined azimuthal orientation and at an orientation normal thereto;

f) associating formation anisotropy with stress in the formation if, at the determined azimuthal orientation, the velocity of the fast flexural wave for one of the relatively high frequency signal and the relatively low frequency signal is greater than the velocity of the slow flexural wave, and at the orientation normal to the determined azimuthal orientation, for the other of the relatively high frequency signal and relatively low frequency signal, the velocity of the fast flexural wave is greater than the velocity of the slow flexural wave; and, if formation anisotropy is associated with stress in the formation;

g) selecting a reference state velocity;

h) determining a velocity change, B, due to uniaxial stress, at a plurality of discrete frequencies; and i) determining the stress magnitude and a plurality of non-linear formation parameters according to the equation:

$$A_1 S + A_2 S c_{111}/c_{66} + A_3 S c_{112}/c_{66} + A_4 S c_{123}/c_{66} = B,$$

where $A_1$, $A_2$, $A_3$, $A_4$, and B are functions of frequency, $c_{66}$ is the formation shear modulus in the reference state, and $A_1$, $A_2$, $A_3$, and $A_4$ are frequency dependent sensitivities of flexural wave velocities to S, $Sc_{111}/c_{66}$, $Sc_{112}/c_{66}$, and $Sc_{123}/c_{66}$, respectively.

2. The method according to claim 1, wherein step (g) further comprises selecting a flexural wave velocity in the reference state and the velocity change of step (h) is due to a difference in the determined flexural wave velocity and flexural wave velocity in the reference state at the plurality of discrete frequencies.

3. The method according to claim 1, wherein step (g) further comprises selecting a Stoneley wave velocity in the reference state and the velocity change of step (h) is due to a difference in the determined Stoneley wave velocity and Stoneley wave velocity in the reference state at the plurality of discrete frequencies.

4. A method of estimating in-situ stress magnitude of an earth formation traversed by a borehole containing borehole fluid by utilizing a sonic logging tool having a monopole source, a plurality of dipole sources, and a plurality of sonic detectors, said method comprising:

a) generating a relatively low frequency signal and a relatively high frequency signal with at least one source;
b) detecting the slow and fast flexural wave arrivals at the detectors for the relatively low frequency signal and the relatively high frequency signal;
c) determining the tube wave velocity;
d) determining the azimuthal orientation of the maximum velocity of at least one of the slow and fast flexural wave arrivals for at least one of the relatively low frequency signal and the relatively high frequency signal;
e) determining the velocities of the slow and fast flexural waves for the relatively low frequency signal and for the relatively high frequency signal at the determined azimuthal orientation and at an orientation normal thereto;
f) associating formation anisotropy with stress in the formation if, at the determined azimuthal orientation, the velocity of the fast flexural wave for one of the relatively high frequency signal and the relatively low frequency signal is greater than the velocity of the slow flexural wave, and at the orientation normal to the determined azimuthal orientation, for the other of the relatively high frequency signal and relatively low frequency signal, the velocity of the fast flexural wave is greater than the velocity of the slow flexural wave; and, if formation anisotropy is associated with stress in the formation,
g) selecting a reference state value for a plurality of formation parameters;
h) determining the stress magnitude and a plurality of nonlinear formation parameters using the plurality of formation parameters and conducting an inversion according to AX=B where $$A = \begin{bmatrix} 1 & 1-\nu & -\nu \\ 1-\nu & \dfrac{1-\nu}{2} & -\dfrac{\nu}{2} \\ -\nu & -\dfrac{\nu}{2} & \dfrac{1-\nu}{2} \end{bmatrix},$$

$$X = \begin{bmatrix} S \\ \dfrac{c_{155}S}{c_{66}} \\ \dfrac{c_{144}S}{c_{66}} \end{bmatrix},$$

$$B = \begin{bmatrix} \dfrac{4c_{66}^2(1+\nu)}{\rho_f V_T^3}(V_{TS} - V_T) \\ \rho_s(V_{12}^2 - V_S^2) \\ \rho_s(V_{13}^2 - V_S^2) \end{bmatrix}$$

where $V_{12}$ is the slow flexural wave velocity, $V_{13}$ is the fast flexural wave velocity, $V_{TS}$ is the tube wave velocity determined in step (c), and the formation parameters include at least $\rho_f$, the borehole fluid density, $\rho_s$, the formation mass density, $V_S$, the shear wave speed, $V_T$, the tube wave speed, and $\sigma$, the Poisson ratio.

* * * * *